(12) United States Patent
Nakane

(10) Patent No.: US 7,868,500 B2
(45) Date of Patent: Jan. 11, 2011

(54) STEPPING MOTOR AND METHOD OF MANUFACTURING THE SAME

(75) Inventor: Hideyuki Nakane, Nishio (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/662,142

(22) Filed: Mar. 31, 2010

(65) Prior Publication Data

US 2010/0194217 A1 Aug. 5, 2010

Related U.S. Application Data

(62) Division of application No. 11/955,694, filed on Dec. 13, 2007, now Pat. No. 7,719,149.

(30) Foreign Application Priority Data

Jan. 31, 2007 (JP) .............................. 2007-020565

(51) Int. Cl.
*H02K 5/16* (2006.01)
(52) U.S. Cl. ...................................................... 310/90
(58) Field of Classification Search .................. 310/90, 310/90.5; 384/100
See application file for complete search history.

(56) References Cited

U.S. PATENT DOCUMENTS

| 5,357,163 | A | * | 10/1994 | Minakuchi et al. ............ 310/90 |
| 5,880,551 | A | | 3/1999 | Prudham |
| 6,787,954 | B2 | * | 9/2004 | Yoshitsugu et al. ........... 310/90 |
| 7,201,516 | B2 | * | 4/2007 | Haga .......................... 384/100 |
| 7,365,940 | B2 | | 4/2008 | Yamamoto et al. |
| 7,622,837 | B2 | * | 11/2009 | Saito et al. .................... 310/90 |
| 2003/0161559 | A1 | | 8/2003 | Kurobe et al. |
| 2006/0002011 | A1 | | 1/2006 | Yamamoto |
| 2006/0222276 | A1 | | 10/2006 | Uenosono |
| 2008/0179977 | A1 | | 7/2008 | Nakane |

FOREIGN PATENT DOCUMENTS

| JP | 07-312855 | 11/1995 |
| JP | 2002-165408 | 7/2002 |
| JP | 2002-340631 | 11/2002 |
| JP | 2006-246593 | 9/2006 |

OTHER PUBLICATIONS

German Office Action dated Oct. 20, 2009, issued in corresponding German Application No. 10 2007 059 884.1-32, with English translation.
Japanese Office Action dated Jan. 6, 2009 issued in corresponding Japanese Application No. 2007-020565 with English Translation.

* cited by examiner

*Primary Examiner*—Nguyen N Hanh
(74) *Attorney, Agent, or Firm*—Nixon & Vanderhye PC

(57) ABSTRACT

A stepping motor includes a housing, a supporting shaft, a rotor, and a stator. The housing includes a first wall and a second wall facing each other. The supporting shaft is inserted into a through hole of the rotor and is held by the first wall and the second wall. The rotor has a first end face and a second end face in an axial direction of the rotor. The first end face and the second end face are separated from the first wall and the second wall, respectively. A lubricant fills between the through hole and the supporting shaft, and an oil repellent agent is applied at a predetermined first area of the first wall around the supporting shaft and a predetermined second area of the second wall around the supporting shaft.

1 Claim, 2 Drawing Sheets

STEPPING MOTOR AND METHOD OF MANUFACTURING THE SAME

CROSS REFERENCE TO RELATED APPLICATION

This application is a Division of Application No. 11/955,694, filed Dec. 13, 2007, which is based on and claims priority to Japanese Patent Application No. 2007-20565 filed on Jan. 31, 2007, the entire contents of both of which are incorporated herein by this reference.

BACKGROUND OF THE INVENTION

1. Field of the Invention

The present invention relates to a stepping motor and a method of manufacturing the same.

2. Description of the Related Art

JP-2002-340631-A discloses a stepping motor that includes a casing having two casing members attached to each other, and a rotor and a stator disposed in the casing.

The rotor has a through hole, and a supporting shaft fixed to the two casing members is inserted in the through hole to rotatably hold the rotor. There is a clearance between the through hole and the supporting shaft so that the rotor rotates smoothly. Thus, the rotor is movable in a radial direction of the rotor for a distance of the clearance. When the rotor moves in the radial direction, the rotor may collide against the supporting shaft, and may generate a noise. Thus, the clearance between the through hole and the supporting shaft is filled with a lubricant so that rotor is restricted from moving in the radial direction and the noise generated by a collision between the through hole and the supporting shaft is reduced.

In the above-described stepping motor, the stator has a plurality of coils. Each of the coils generates a magnetic field by being supplied with electricity, and direction of magnetic fluxes of the magnetic fields cross each other. Thus, when electricity supply to each of the coils is switched in order and a direction of a magnetic flux passing through the yoke and the rotor is then switched in order, the rotor rotates on the supporting shaft. At the same time, the rotor moves in the radial direction of the rotor. When the rotor moves in the radial direction, the lubricant filling the clearance between the through hole and the supporting shaft may be flow out from the through hole. In a case where the lubricant flowing out from the though hole attaches at a portion in the vicinity of the through hole, the lubricant may be drawn in the through hole by the radial movement of the rotor. However, in a case where the lubricant flows out to another portion far from the through hole, the lubricant may be kept at the portion and may not return to the through hole. In the present case, the lubricant filling the through hole may be reduced as an operation time passes, and eventually, the rotor may directly collide with the supporting shaft and may generate a noise.

SUMMARY OF THE INVENTION

It is an object of the present invention to provide a stepping motor and/or a method of manufacturing a stepping motor that restricts a lubricant filling between a through hole and a supporting shaft from flowing out from the through hole.

According to an aspect of the invention, a stepping motor includes a housing, a supporting shaft, a rotor, and a stator. The housing includes a first wall a second wall facing each other, and the supporting shaft held by the first wall and the second wall. The rotor has a through hole into which the supporting shaft is inserted to hold the rotor. The rotor has a first end face and a second end face in an axial direction of the supporting shaft. The first end face and the first wall have a first clearance therebetween, and the second end face and the second wall have a second clearance therebetween. The stator is arranged to surround the rotor and includes a magnetic yoke and a coil. A lubricant fills between the through hole and the supporting shaft, and an oil repellent agent is applied at a predetermined first area of the first wall around the supporting shaft and a predetermined second area of the second wall around the supporting shaft.

In the present stepping motor, when the lubricant filling between the through hole and the supporting shaft sticks out from the through hole due to a radial movement of the rotor and contacts with the oil repellent agent, which is applied at the first wall and the second wall, the lubricant is repelled by the oil repellent agent and is restricted from flowing out to an outside of the first clearance and the second clearance. When the rotor further moves in a radial direction, the sticking-out lubricant is drawn in a clearance provided between the through hole and the supporting shaft. Thus, in the present stepping motor, the lubricant is restricted from flowing out to the outside even when the lubricant sticks out from the through hole due to the radial movement of the rotor. As a result, the lubricant is kept between the through hole and the supporting shaft and a noise due to a direct collision between the rotor and the supporting shaft is restricted.

Alternatively, the oil repellent agent may be applied at a predetermined first area of the first end face around the through hole and a predetermined second area of the second end face around the through hole.

In the present case, when the lubricant flows out from the through hole and contacts with the oil repellent agent, which is applied at the first area of the first end face around the though hole and the second area of the second end face around the through hole, the lubricant is repelled by the oil repellent agent and is restricted from flowing out to an outside of the first clearance and the second clearance. Thus, the lubricant is kept between the through hole and the supporting shaft, and a noise due to a direct collision between the rotor and the supporting shaft is restricted.

According to another aspect of the invention, a method of manufacturing a stepping motor includes: preparing a first case that includes a first wall having a first hole; preparing a second case that includes a second wall having a second hole; applying an oil repellent agent at a predetermined first area of the first wall around the first hole; applying the oil repellent agent at a predetermined second area of the second wall around the second hole; inserting one end of a supporting shaft into the first hole; applying a lubricant to the supporting shaft; inserting the supporting shaft applied with the lubricant into a through hole of a rotor; and attaching the second case to the first case so that the other end of the supporting shaft is inserted into the second hole.

In a stepping motor manufactured by the above-described method, the lubricant fills between the through hole of the rotor and the supporting shaft. When the lubricant sticks out from the through hole due to a radial movement of the rotor and contacts with the oil repellent agent, which is applied at the first area of the first wall and the second area of the second wall, the lubricant is repelled by the oil repellent agent and is restricted from flowing out to an outside. When the rotor further moves in a radial direction, the sticking-out lubricant is drawn in a clearance provided between the through hole and the supporting shaft. Thus, the lubricant is restricted from flowing out to the outside even when the lubricant sticks out from the through hole due to the radial movement of the rotor. As a result, the lubricant is kept between the through hole and the supporting shaft and a noise due to a direct collision between the rotor and the supporting shaft is restricted.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1:
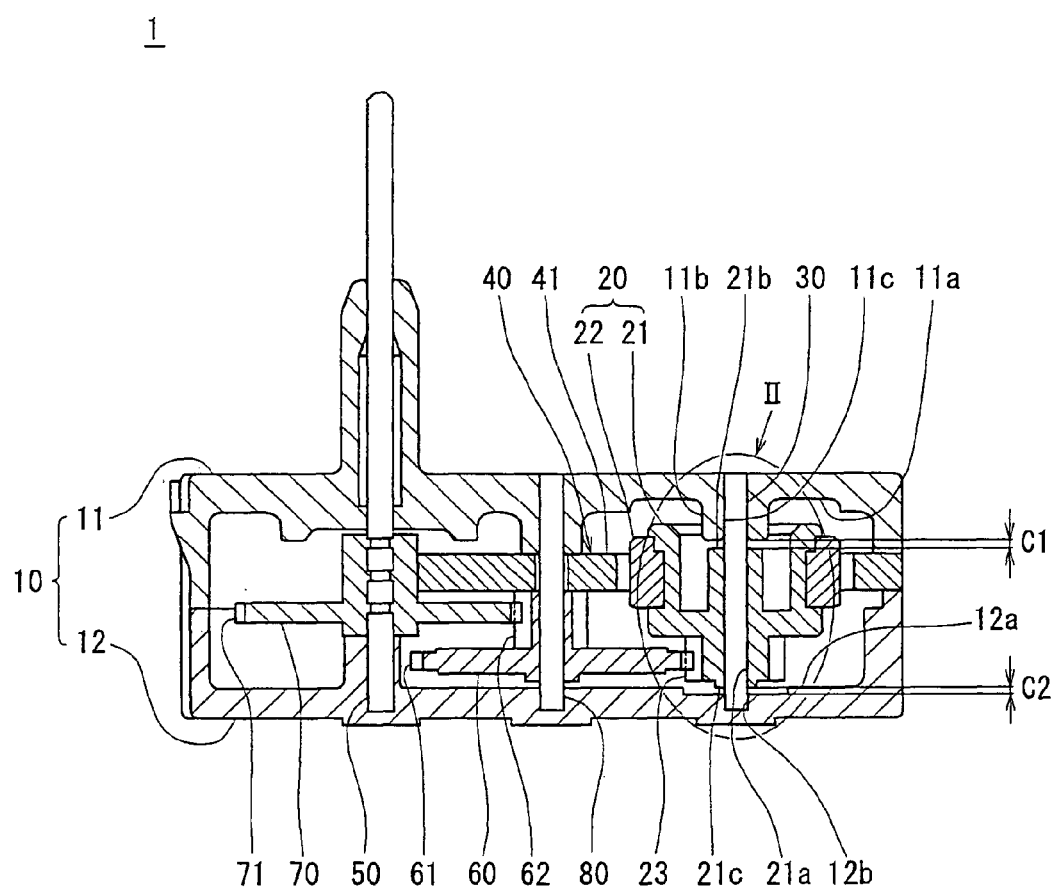
FIG. 1 is a cross-sectional view of a stepping motor according to a first embodiment of the present disclosure.

A stepping motor in FIG. 1 can be suitably used for rotating a pointer of an instrument equipped in a vehicle, for example.

The stepping motor 1 includes a housing 10, a rotor 20 rotatably held in the housing 10, a stator 40 arranged to surround the rotor 20, an output shaft 50 for rotating the pointer, and a gear train arranged in the housing 40 for transmitting a torque generated by the rotor 20 to the output shaft 50.

The housing 10 includes a first case 11 and a second case 12 each having a bottom wall, a sidewall extending from the bottom wall, and an opening portion defined by an end portion of the sidewall and being opposed to the bottom wall. The cases 11 and 12 are attached to each other at the end portions of the sidewalls so that the bottom wall of the first case 11 (i.e., a first wall 11a) faces the bottom wall of the second case 12 (i.e., a second wall 12a). For example, the first case 11 and the second case 12 are made of resin. The rotator 20 is rotatably held by a supporting shaft 30, and the supporting shaft 30 is held by the first wall 11a and the second wall 12a.

Figure 2:
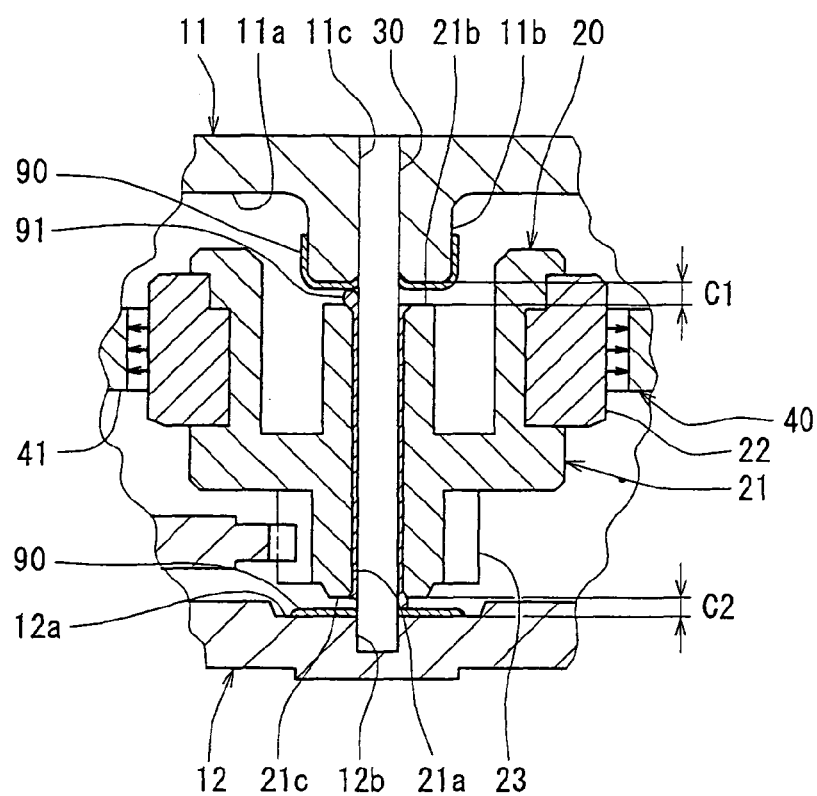
FIG. 2 is an enlarged cross-sectional view of a part of the stepping motor shown by an arrow II in FIG. 1.

As shown in FIG. 2, each of the first wall 11a and the second wall 12a is applied with an oil repellent agent 90 at a predetermined area around the supporting shaft 30. For example, the oil repellent agent 90 is applied at an approximately circular area centering on the supporting shaft 30 and having a predetermined diameter. The oil repellent agent 90 is made of a fluorine material, for example. The liquid-state oil repellent agent 90 is applied to the first wall 11a and the second wall 12a and is dried, and thereby a surface of the oil repellent agent 90 has a high oil repellent property. When an oil, for example, a lubricant is dropped on a surface of an object applied with the oil repellent agent 90, the lubricant is repelled by the oil repellent agent 90 and has an approximately spherical shape. Therefore, the lubricant is restricted from spreading on a surface of the object and wetting the object.

The supporting shaft 30 is made of a nonmagnetic metal and is formed into an approximately cylindrical shape. One end of the supporting shaft 30 is fixed by being press-inserted into the first case 11. The other end of the supporting shaft 30 is inserted into the second case 12. Specifically, the first wall 11a has a boss part 11b and a supporting hole 11c. The boss part 11b protrudes toward the second wall 12a and the supporting hole 11c is provided at an approximately center portion of the boss part 11b. The one end of the supporting shaft 30 is press-inserted into the supporting hole 11c and is strongly fixed by the boss part 11b. The supporting hole 11c extends in an axial direction of the supporting shaft 30 so that the supporting shaft 30 is strongly held in the first case 11 at an appropriate position. On the other hand, the second wall 12a has an insertion hole 12b, and the other end of the supporting shaft 30 is inserted into the insertion hole 12b.

The stepping motor 1 generates a driving torque by using the rotor 20 and the stator 40. The rotor 20 includes a cylindrical part 21 and a ring-shaped magnet 22 coaxially surrounding the cylindrical part 21. The cylindrical part 21 is made of a nonmagnetic material such as resin. The cylindrical part 21 has a through hole 21a that is provided coaxially with the cylindrical part 21 and the magnet 22. The supporting shaft 30 is inserted into the through hole 21a to rotatably hold the cylindrical part 21. The magnet 22 is magnetized in such a manner that a north pole and a south pole are alternately arranged in a circumferential direction. In a state where the supporting shaft 30 is inserted in the rotor 20, there is a clearance between the supporting shaft 30 and the through hole 21a. The clearance is filled with a lubricant 91 so that an oil film is provided between the through hole 21a and the supporting shaft 30. Thus, when the stepping motor 1 is in operation, the rotor 20 is restricted from directly colliding against the supporting shaft 30 and a noise is reduced. When the stepping motor 1 is stopped, the lubricant 91 remains in the clearance between the through hole 21a and the supporting shaft 30 due to its own surface tension. The rotor 20 has rotor gear teeth 23 included in the gear train for transmitting the torque generated by the rotor 20 to the output shaft 50. The rotor gear teeth 23 are integrally formed with the cylindrical part 21.

The stator 40 is arranged between the first wall 11a and the second wall 12a. The stator 40 includes a yoke 41 and field windings (not shown) as coils. The yoke 41 is made of a magnetic material, e.g., a magnetic metal material. For example, the yoke 41 is made of a plurality of laminated magnetic steel sheets formed by press molding.

The rotor 20 has a first end face 21b and a second end face 21c in an axial direction of the rotor 20. The first end face 21b is opposed to the first wall 11a with a clearance C1 therebetween. In contrast, the second end face 21c is opposed to the second wall 12a with a clearance C2 therebetween.

A magnetic flux generated by the magnet 22 and/or a magnetic flux generated by supplying electricity to the coils of the stator 41 flow between the magnet 22 and the yoke 41. The magnetic flux flows in a direction as shown by arrows in FIG. 2, for example. A length of the magnetic flux between the magnet 22 and the yoke 41 becomes the shortest due to a magnetic force by the magnetic flux. Thus, an axial position of the rotator 20 with respect to the stator 40 is kept by the magnetic force in such a manner that the magnetic flux between the magnet 22 and the yoke 41 has the shortest length. The axial position of the rotator 20 with respect to the housing 10 is set in such a manner that in a state where the rotator 20 is stably kept by the magnetic force, the first end face 21b of the rotor 20 and the first wall 11a of the housing 10 have the clearance C1 therebetween and the second end face 21c of the rotor 20 and the second wall 12a of the housing 10 have the clearance C2 therebetween. When the rotor 20 moves in the axial direction, the rotor 20 is restored to its original position due to the magnetic force by the magnetic flux. Thereby, the rotor 20 is stably kept at a predetermined position.

As shown in FIG. 1, an intermediate gear 60 included in the gear train is arranged in the housing 10. The intermediate gear 60 has first gear teeth 61 and second gear teeth 62 which are coaxially arranged. The first gear teeth 61 engage with the rotor gear teeth 23, and the second gear teeth 62 engage with gear teeth 71 of an output gear 70 that is fixed to the output shaft 50. The intermediate gear 60 is rotatably held by an intermediate shaft 80 that is fixed to the housing 10. In the housing 10, the supporting shaft 30, the intermediate shaft 80, and the output shaft 50 are arranged in parallel with each other. The gear train includes the rotor gear teeth 23, the intermediate gear 60, and the output gear 70.

As described-above, the rotor gear teeth 23 engage with the first gear teeth 61 of the intermediate gear 60. In addition, the second gear teeth 62 of the intermediate gear 60 engage with the gear teeth 71 of the output gear 70. Thus, the torque generated by the rotor 20 is transferred from the rotor gear teeth 23 to the output shaft 50 through the intermediate gear 60 and the output gear 70, and thereby the output shaft 50 is rotated. Now, the tooth number of the rotator gear teeth 23, the first gear teeth 61 and the second gear teeth 62 of the intermediate gear 60, and the gear teeth 71 of the output gear 70 are expressed as Z23, Z61, Z62, Z71, respectively. When a rotation rate of the rotor 20 is set to N rpm, a rotation rate of the output shaft 50 is expressed by N×(Z23/Z61)×(Z62/Z71). In addition, in the tooth number of the gear teeth 23, 61, 62 and 71, there are relationships of Z23<Z61, and Z62<Z71. Thereby, the output shaft 50 has a smaller rotation rate and a larger torque compared with those of the rotor 20. Thus, even when the rotor 20 is small and lightweight, the pointer (not shown) fixed to the output shaft 50 can be rotated. The intermediate gear 60 and the output gear 70 may be made of a resin, for example. In the present case, a collision noise generated at an engaging portion between the rotor gear teeth 23 and the first gear teeth 61 of the intermediate gear 60 and at an engaging portion between the second gear teeth 62 of the intermediate gear 60 and the gear teeth 71 of the output gear 70 is reduced. Thereby, the stepping motor 1 can be operated silently.

An operation of the stepping motor 1 will now be described. The stator 40 has a plurality of coils (not shown) each generating a magnetic field by being supplied with electricity. The coils are arranged in such a manner that directions of magnetic fluxes of the magnetic fields generated by the coils cross each other. When an electricity supply to the coils is switched in order and a direction of magnetic flux flowing between the yoke 41 and the rotor 20 is then switched in order, the rotor 20 is rotated. Specifically, while the electricity supply to one of the coils is stopped, the electricity supply to another one of the coils is started. Then, the rotor 20 is rotated by the magnetic flux of the coil that is being supplied with electricity. At the same time, the rotor 20 moves in the radial direction by being pulled by the yoke 41 that is adjacent to the coil being supplied with electricity. Thus, when the stepping motor 1 is in operation, the rotor 20 rotates on the supporting shaft 30 while moving in the radial direction.

When the stepping motor 1 is in operation, the lubricant 91 filling the clearance between the through hole 21a and the supporting shaft 30 may be pushed out from the through hole 21a to an outside by the radial movement of the rotor 20. The lubricant 91 sticking out from the clearance between the through hole 21a and the supporting shaft 30 may attach to the first wall 11a and/or the second wall 12a facing the first end face 21b and the second end face 21c of the rotor 20, respectively. In the present case, the first wall 11a and the second wall 12a are applied with the oil repellent agent 90 at the predetermined areas around the supporting shaft 30. Thus, the lubricant 91 is repelled by the oil repellent agent 90 and is kept in the clearance between the through hole 21a and the supporting shaft 30 without flowing out in the radial direction of the rotor 20. When the rotor 20 further rotates and moves in the radial direction, the clearance behind a portion where the lubricant 91 is sticking out is widened, and thereby the sticking-out lubricant 91 is drawn in the clearance. Thus, the lubricant 91 filling the clearance between the through hole 21a and the supporting shaft 30 is restricted from flowing out to the outside due to the radial movement of the rotor 20 when the stepping motor 1 is in operation. As a result, the lubricant 91 is kept in the clearance and a noise due to a direct collision between the rotor 20 and the supporting shaft 30 is restricted.

In the above-described structure, the oil repellent agent 90 is applied to the first wall 11a and the second wall 12a, which does not move when the stepping motor 1 is in operation. In a case where the oil repellent agent 90 is applied to a movable member, e.g., the rotor 20, the oil repellent agent 90 may fall away due to a centrifugal force of the rotor 20 when the stepping motor 1 is operated and the rotor 20 rotates. In contrast, in the stepping motor 1 shown in FIG. 2, the oil repellent agent 90 is applied to an immovable member, i.e., the first wall 11a and the second wall 12a. Thus, the oil repellent agent 90 is stably kept at an applied position without falling away when the stepping motor 1 is operated.

Additionally, the first clearance C1 between the first wall 11a and the first end face 21b of the rotor 20 and the second clearance C2 between the second wall 12a and the second end face 21c of the rotor 20 are always maintained in the stepping motor 1. Specifically, when the stepping motor 1 is in operation, the axial position of the rotor 20 is kept by the magnetic force of the magnetic flux generated by the coils (not shown) of the stator 4, which is supplied with electricity, and the magnetic flux of the magnet 22. In contrast, when the stepping motor 1 is stopped, the axial position of the rotor 20 is kept by the magnetic force of the magnetic flux of the magnet 20. Thereby, the first clearance C1 and the second clearance C2 are stably maintained at all times. In the present case, the rotor 20 rotates without contacting with the oil repellent agent 90 applied to the first wall 11a and the second wall 12a, that is, the rotor 20 is prevented from contacting with the oil repellent agent 90. Thus, the oil repellent agent 90 is kept on the first wall 11a and the second wall 12a without falling away by a contact with the rotor 20, and the lubricant 91 is continuously kept in the clearance between the through hole 21a and the supporting shaft 30 due to an effect of the oil repellent agent 90. Thereby, the noise is restricted permanently.

Furthermore, in the stepping motor 1, the magnetic flux flows between the magnet 22 and the yoke 41 perpendicularly with the axial direction of the rotor 20. Thus, a midpoint of the magnet 22 corresponds with a midpoint of the yoke 41 in the axial direction of the rotor 20. When the rotor 20 moves in the axial direction, the rotor 20 is restored to its original position due to the magnetic force by the magnetic flux. Thereby, the rotor 20 is stably kept at the predetermined position. In addition, the axial position of the rotator 20 with respect to the housing 10 is set in such a manner that in the state where the rotator 20 is stably kept by the magnetic force, the first end face 21b of the rotor 20 and the first wall 11a of the housing 10 have the clearance C1 therebetween and the second end face 21c of the rotor 20 and the second wall 12a of the housing 10 have the clearance C2 therebetween. The first and the second clearance C1 and C2 are stably kept, and thereby the rotor 20 is prevented from removing the oil repellent agent 90 from the applied members when the rotor 20 is rotated.

A method of manufacturing the stepping motor 1 will now be described. At first, the first case 11 and the second case 12 are formed by resin molding. Next, the first case 11 and the second case 12 are arranged in upward positions so that the opening portions of the first case 11 and the second case 12 are located on the first wall 11a and the second wall 12a, respectively. Then, the liquid-state oil repellent agent 90 is applied at the predetermined area of the boss part 11*b* around the supporting hole 11*c*, specifically, on the end face and an outer peripheral face of the boss part 11*b*, and the predetermined area of the second wall 12*a* around the insertion hole 12*b*. In the present case, a predetermined amount of the oil repellent agent 90 may be injected by using a nozzle, for example. Then, the liquid-state oil repellent agent 90 applied at the first case 11 and the second case 12 is dried.

Next, the one end of the supporting shaft 30 is press-inserted into the supporting hole 11*c* of the boss part 11*b*, and the stator 40 is attached to the first case 11. Then, the first case 11 is arranged in such a manner that the other end of the supporting shaft 30 is in an upward direction. The lubricant 91 is applied to the other end portion of the supporting shaft 30, and the supporting shaft 30 is then inserted into the rotor 20. The clearance between the through hole 21*a* and the supporting shaft 30 is filled with the lubricant 91 by inserting the supporting shaft 30 applied with the lubricant 91 into the through hole 21 a of the rotor 20.

Next, the output gear 70 is fixed to the output shaft 50, and the output shaft 50 is inserted into the first case 11. Then, the intermediate shaft 80 is press-inserted into the first case 11, and the intermediate shaft 60 is fit to the intermediate gear 80 so that the first gear teeth 61 engage with the rotor gear teeth 23 and the second gear teeth 62 engage with the gear teeth 71 of the output gear 70. At last, the second case 12 is attached to the first case 11 so that the other end of the supporting shaft 30 is inserted into the insertion hole 12*b*.

As described above, only an applying process of the oil repellent agent 90 to the housing 10 is added in a conventional manufacturing process of the stepping motor 1, and a large process change is not required.

Second Embodiment

Figure 3:
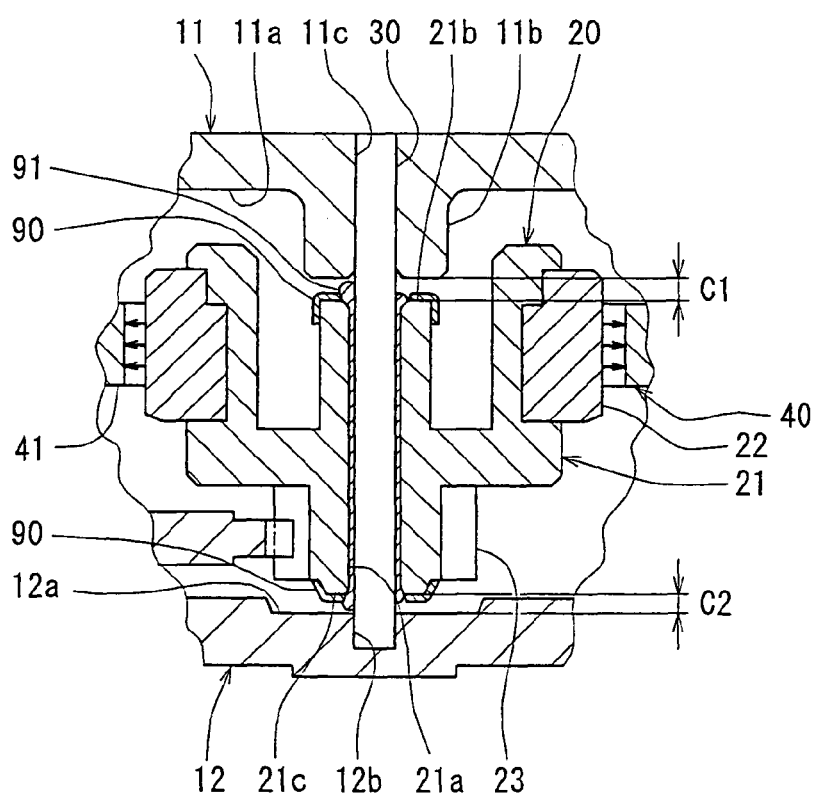
FIG. 3 is an enlarged cross-sectional view of a part of a stepping motor according to a second embodiment of the present disclosure.

As shown in FIG. 3, the oil repellent agent 90 may be applied to the first end face 21*b* and the second end face 21*c* of the rotor 20 instead of the first wall 11*a* and the second wall 12*a* of the housing 10.

Also in the present case, the oil repellent agent 90 restricts the lubricant 91 filling the clearance between the through hole 21*a* and the supporting shaft 30 from flowing out to the outside due to the radial movement of the rotor 20 when the stepping motor 1 is in operation. Thus, the lubricant 91 is kept between the rotor 20 and the supporting shaft 30, and thereby a noise due to a direct collision between the rotor 20 and the supporting shaft 30 is restricted.

Additionally, in the stepping motor 1 in FIG. 3, the first end face 21*b* and the first wall 11*a* have the clearance C1 therebetween, and the second end face 21*c* and the second wall 12*a* have the clearance C2 therebetween. Thus, when the rotor 20 is rotated, the oil repellent argent 90 does not contact with other member, and thereby the oil repellent agent 90 is stably kept at the applied portion. As a result, the lubricant 91 is stably kept at the clearance between the through hole 21*a* and the supporting shaft 30, and the noise is restricted permanently.

Other Embodiments

Above-described structures of the stepping motors 1 in FIGS. 2 and 3 may be combined. Specifically, the oil repellent agent 90 may be applied at the first end face 21*b* and the second end face 21*c* of the rotor 20 in addition to the first wall 11*a* and the second wall 12*a* of the housing 10.

A material of the housing 10 is not limited to resin. The housing 10 may be made of other material, e.g., aluminum, which is a nonmagnetic material.

In the stepping motors 1 in FIGS. 2 and 3, both of the intermediate gear 60 and the output gear 70 are made of a resin, for example. Alternatively, one of the intermediate gear 60 and the output gear 70 may be made of a metal. Even when one of engaging gears is made of a resin and another one of the engaging gears is made of a metal, a noise at the engaging portion is reduced.

Such changes and modifications are to be understood as being within the scope of the present invention as defined by the appended claims.

What is claimed:

1. A stepping motor comprising:
a housing includes a first wall and a second wall facing each other;
a supporting shaft held by the first wall and the second wall;
a rotor having a through hole into which the supporting shaft is inserted to rotatably hold the rotor, wherein the rotor has a first end face and a second end face in an axial direction of the rotor, the first end face and the first wall have a first clearance therebetween, and the second end face and the second wall have a second clearance therebetween;
a stator arranged to surround the rotor and including a magnetic yoke and a coil;
a lubricant filling between the through hole and the supporting shaft; and
an oil repellent agent applied at a predetermined first area of the first end face around the through hole and a predetermined second area of the second end face around the through hole, wherein:
the rotor further includes a magnet having a ring shape and coaxially arranged with the through hole; and
the first clearance and the second clearance are provided by a magnetic force due to a magnetic flux flowing between the magnet and the magnetic yoke.

\* \* \* \* \*